United States Patent [19]

Lewis et al.

[11] Patent Number: 4,617,183

[45] Date of Patent: Oct. 14, 1986

[54] PRODUCTION AND RECOVERY OF ALUMINA FROM VAPOR PHASE HYDROLYSIS OF ALUMINUM TRIALKOXIDES

[75] Inventors: Duane J. Lewis, Ponca City, Okla.; William H. McNeese, Aberdeen, Miss.

[73] Assignee: Vista Chemical Company, Houston, Tex.

[21] Appl. No.: 771,574

[22] Filed: Aug. 30, 1985

[51] Int. Cl.$^4$ ............................................... C01F 7/02
[52] U.S. Cl. .................................................. 423/630
[58] Field of Search .............................. 423/625, 630

[56] References Cited

U.S. PATENT DOCUMENTS 2,776,188  1/1957  Gilbert ................................ 423/630
3,056,725  10/1962  Rinse et al. ........................ 423/630

FOREIGN PATENT DOCUMENTS 587907  12/1959  Canada ................................ 423/630
756995  4/1967  Canada ................................ 423/630
38-11602  9/1963  Japan ................................. 423/630

Primary Examiner—H. T. Carter
Attorney, Agent, or Firm—Browning, Bushman, Zamecki & Anderson

[57] ABSTRACT

A process for the vapor phase production of alumina by introducing steam into the vapor space above a heated, liquid phase aluminum alkoxide in which the aluminum alkoxide is hydrolyzed in a heated reaction zone downstream from the liquid alkoxide and collected as a dry powder without the necessity for utilizing conventional drying processes.

8 Claims, 1 Drawing Figure

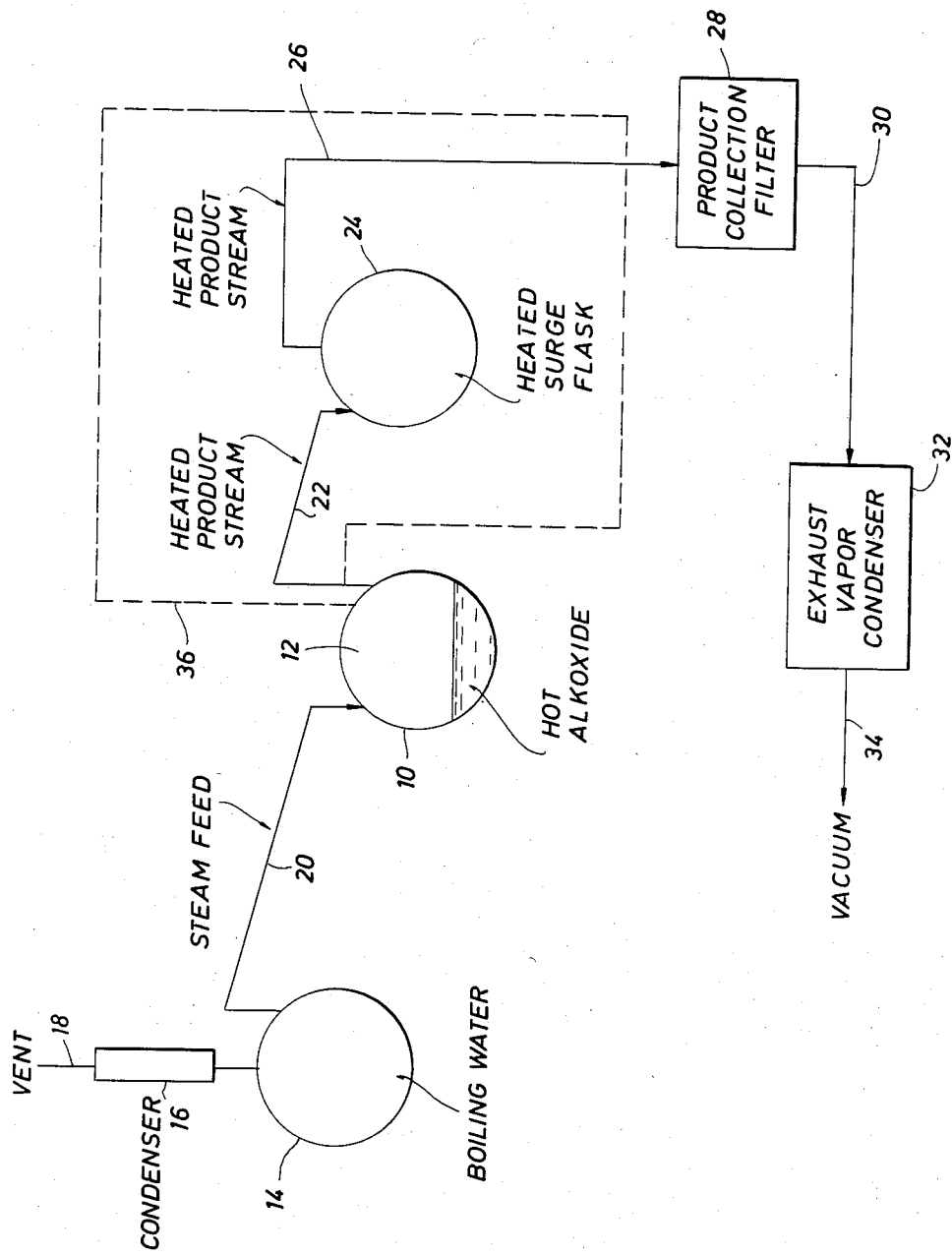

PRODUCTION AND RECOVERY OF ALUMINA FROM VAPOR PHASE HYDROLYSIS OF ALUMINUM TRIALKOXIDES

BACKGROUND OF THE INVENTION

The present invention relates to the production of alumina and, more particularly, to the production and recovery of alumina from the vapor phase reaction between steam and an aluminum alkoxide.

It is known to produce alumina by contacting an aluminum alkoxide with water in a liquid phase reaction according to the following equation:

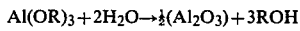

$$Al(OR)_3 + 2H_2O \rightarrow \tfrac{1}{2}(Al_2O_3) + 3ROH$$

The reaction is normally carried out in a large excess of water so that an aqueous slurry containing roughly 12% $Al_2O_3$ is formed. The alcohols formed in the hydrolysis separate as a separate liquid phase and are removed by decanting the bulk phase and then steam stripping the aqueous slurry to remove dissolved alcohols. The alumina is then recovered by flash drying the slurry in a spray dryer or other similar drying apparatus. Since there is a relatively large quantity of excess water used in the process to maintain the alumina in a slurry form, the spray drying process adds significant energy costs to the process.

U.S. Pat. No. 2,579,251 disclose the preparation of alumina by admixing aluminum alkoxide vapors with steam to hydrolyze the aluminum alkoxides suspended therein. However, in the process disclosed in the patent, the aluminum alkoxide is initially prepared in vapor form in advance of its reaction with the gaseous steam. This adds significantly to the complexity and energy costs of the overall reaction to produce alumina.

SUMMARY OF THE INVENTION

It is therefore an object of the present invention to provide an improved method for producing alumina by vapor phase hydrolysis of aluminum trialkoxides using heated steam.

Another object of the present invention is to provide a method for recovering alumina produced by the vapor phase hydrolysis of aluminum trialkoxides.

Yet another object of the present invention is to provide a process for recovering alumina directly as a dry, particulate solid from the vapor phase hydrolysis of aluminum trialkoxides.

The above and other objects of the present invention will become apparent from the drawing, the description given herein and the appended claims.

In one embodiment, the present invention provides an improved process for recovering alumina produced by vapor phase hydrolysis in which aluminum trialkoxides, in vapor form, are reacted, with steam to form a product stream comprising alumina, steam and alcohol. The product stream is maintained at a temperature sufficient to prevent condensation of water and alcohol, the product stream being passed through a collection means to collect the alumina as a dry powder without the necessity for further drying techniques. The dry, alumina powder is then recovered from the collection means.

In another embodiment of the present invention, a liquid aluminum trialkoxide is heated to an elevated temperature but below the boiling point of the alkoxide. Steam is introduced into the vapor space above the heated alkoxide to effect at least partial hydrolysis of at least some of the alkoxide molecules at the surface of the heated alkoxide. The mixture of excess steam and partially hydrolyzed alkoxide is then flowed through a heated reaction zone to effect complete hydrolysis of the alkoxide and form a product stream containing alumina, steam and alcohol, the alumina being recovered from the product stream. In the preferred method of recovery, the alumina is recovered as a dry powder in the manner described above.

BRIEF DESCRIPTION OF THE DRAWING

The single FIGURE is a schematic flow diagram depicting the process of the present invention.

DESCRIPTION OF THE PREFERRED EMBODIMENTS

The aluminum trialkoxide (alkoxide) starting material utilized in the process of the present invention can be produced, in the well known manner, by reacting a low molecular weight alcohol, particularly a branched chain alcohol, with an aluminum bearing material. As used herein, the term "aluminum bearing material" is intended to include pure aluminum as well as aluminum alloys and mixed alloy scrap. Typical methods for preparing such aluminum alkoxides are shown, for example, in U.S. Pat. No. 4,242,271. Preferred aluminum alkoxides are those wherein the alcohol contains from 2 to 6 carbon atoms, particularly such alcohols which are branched chain. Nonlimiting examples of such alcohols include ethanol, propanol, isopropanol, butanol, isobutanol etc., isopropanol being especially preferred.

In carrying out the process of the present invention, the aluminum alkoxide, in liquid form, is placed in a suitable vessel which provides for a vapor space above the surface of the liquid alkoxide. The aluminum alkoxide is then heated at atmospheric pressure to an elevated temperature below the boiling point of the alkoxide. Generally speaking, the alkoxide is heated to a temperature within about 20° C. of its boiling point, although higher temperatures, not exceeding the boiling point, can be used.

When the aluminum alkoxide has been heated to the desired temperature, steam is introduced into the vessel in the vapor space above the surface of the liquid alkoxide. While the mechanism is not entirely understood, it is believed that the steam in the vapor space reacts with at least some of the molecules of alkoxide at the surface of the liquid phase and that at least partial hydrolysis of such alkoxide molecules occur. The partially hydrolyzed alkoxide, being more volatile than the unhydrolyzed alkoxide, is easily swept from the reaction vessel using steam and is then completely hydrolyzed into alumina and the precursor alcohol. While it will be apparent that complete hydrolysis of some of the alkoxide may occur as soon as steam is introduced into the vapor space above the liquid surface of the heated alkoxide, to ensure complete hydrolysis to alumina, the mixture of any alumina, partially hydrolyzed alkoxide, alcohol and excess steam are passed through a heated reaction zone where the hydrolysis reaction is completed to form a product stream comprising alumina, the precursor alcohol and steam. It is important that the reaction zone including any connecting piping, tubing or the like forming the reaction zone be heated to a temperature sufficient to prevent condensation of water and the alcohol produced in the hydrolysis reaction. The heated product stream is then passed through a particle collecting means, e.g. a filter, which traps the particulate alumina, as a dry powder without further drying. Generally speaking, the collection means, e.g. the filter, will be heated to ensure that the alumina is collected as a dry powder and that no condensation of alcohol and/or water occurs on the filter. It will be apparent that such condensation would make recovery of the alumina powder from the collection means more difficult in that additional drying would be necessary. The product stream exciting from the solid collection means contains essentially water and alcohol and can be further treated to condense the alcohol which can then be recovered for reaction with more aluminum bearing material to produce more alkoxide.

For a fuller explanation of the process of the present invention, reference is now made to the accompanying FIGURE. The aluminum alkoxide is introduced into a vessel or flask 10 which provides for a vapor space 12 above the surface of the alkoxide. The alkoxide is heated in any suitable manner to a temperature below the boiling point of the alkoxide, the precise temperature, of course, depending upon the particular alkoxide employed. Steam is generated in a steam generating vessel 14 provided with a condenser 16 and a vent 18. The steam produced in vessel 18 is fed via line 20 into vessel 10 and, more specifically, into the vapor space 12 above the surface of the hot alkoxide. In vessel 10, it is believed that partial hydrolysis of at least some of the surface molecules of the hot alkoxide occurs although, as noted above, some complete hydrolysis with the concomitant production of alumina may also occur in vessel 10. The steam flowing through vessel 10 carries the partially hydrolyzed alkoxide plus any alumina or alcohol produced by complete hydrolysis out of vessel 10 via line 22 and into a surge flask or tank 24. While unnecessary, surge flask 24 serves to collect any condensed water or alcohol and also traps any alkoxide which might be carried over from vessel 10. The product stream exits vessel 24 via line 26 and passes into a heated product collection filter 28 where the alumina collects as a dry powder. The product stream, substantially free of alumina, exits product collection filter 28 via line 30 and is introduced into a condenser 32 where alcohol and/or water from the product stream are condensed and removed, the alcohol being recovered for recycle to the alkoxide production zone (not shown). To induce and aid in steam flow through the system, a slight vacuum is pulled on the system, via line 34 connected to a suitable vacuum source not shown.

As noted above, any partially hydrolyzed alkoxide in vessel 10 separates from the bulk liquid alkoxide phase and is swept downstream by excess steam flow. While some complete hydrolysis may occur in the vapor space above the liquid alkoxide, the main hydrolysis reaction, i.e. complete conversion of the alkoxide to alumina and alcohol, occurs in the steam atmosphere in a heated reaction zone downstream of vessel 10.

It can be seen that line 22, surge flask 24 and line 26, all of which are heated, provide a heated reaction zone 36 (shown in dotted lines) which keeps the product stream heated to a temperature which prevents condensation of alcohol and/or water and permits the alumina product to be collected on filter 28 as a dry powder. It is to be understood that the heated reaction zone can take any form which permits the product stream to be maintained at a sufficiently high temperature to prevent alcohol/water condensation and need not include surge flask 24 or any similar vessel. While, as shown in the FIGURE, the solids product collection means is depicted as a filter, it will be apparent to those skilled in the art that other types of apparatus used for separating solids from gases can be employed. For example, cyclone separators and mechanical centrifugal separators can also be employed. Additionally, it is possible to use electrostatic precipitators, ultrasonic collectors, etc. As for filter-type collectors, bag filters, full fabric filters or the like can be employed.

To more fully illustrate the invention, the following nonlimiting example is presented.

EXAMPLE

Aluminum triisopropoxide was produced by methods described in the prior art using 156 g of isopropyl alcohol and 17 g of aluminum granules. This produced a liquid product containing approximately 75% aluminum triisopropoxide and 25% excess isopropanol. The excess isopropanol was removed by distillation.

The aluminum triisopropoxide was then placed in a flask, e.g. vessel 10 in the FIGURE, and heated to 200° C. at atmospheric pressure. Steam flow was induced across the surface of the hot alkoxide by pulling a slight vacuum on the discharge of the collection filter. The glass lines connecting the alkoxide flask 10 and the filter, e.g. lines 22, 26 and surge flask 24, were heat traced to maintain their temperature at greater than 100° C. As soon as steam flow was induced into vessel 10, the production of alumina began as evidenced by the product stream being a heavy white smoke. The product stream from flask 10 was passed through the heated filter 28 where product alumina was collected as a dry powder. The gas stream exiting filter 28 was clear which indicated a high product collection efficiency. The gas stream leaving filter 28 was condensed in condenser 32. It was also noted that a small quantity of product alumina had settled out in lines 22 and 26 and surge flask 24.

The purities of the alumina product and the crude alkoxide were determined by atomic absorption and are compared below. For comparison purposes, the quantities of impurities are shown adjusted to a common aluminum content basis.

|  | PPM | | | | | | | PERCENT |
| --- | --- | --- | --- | --- | --- | --- | --- | --- |
|  | Fe | Na | Si | Ca | Zn | Ni | Mg | Al |
| Alkoxide | 2752 | 20 | 204 | 8 | 35 | 34 | 11 | 36.9 |
| Alumina | 26 | 13 | 200 | <2 | 19 | 28 | 12 | 36.9 |

It can be seen from the table above that the major impurity, iron, is greatly reduced while most other metal impurities are reduced slightly. It is believed that this reduction in iron may be due to the unique method by which the alkoxide is hydrolyzed. It is postulated that aluminum containing alkoxide molecules are selectively expelled from the surface of the heated alkoxide while iron containing impurities remain in the liquid phase alkoxide.

The product alumina was analyzed and found to contain 4.5 to 7.5% carbon and 4 to 9% free water. It is suspected that these impurities exist absorbed on the surface of the alumina product. X-ray diffraction analysis showed the alumina produced to be non-crystalline. Further analysis of the alumina under an electron microscope disclosed that the alumina was composed entirely of unaglomerated, near perfect spheres typically less than 1 micron in diameter. The surface area of the alumina product was determined to be 314 m$^2$/g. Analysis of pore volume distribution showed that the majority of the pores ranged from 1000 Angstroms to 10,000 Angstroms in diameter. Typical aluminas prepared in aqueous phase hydrolysis process generally have surface areas in the neighborhood of 270 m$^2$/g, while the majority of the pores ranging in size from about 35 to about 100 Angstroms. Thus, the alumina produced in accordance with the present invention appears to possess novel physical properties.

It will be apparent that the process of the present invention results in the production of a high purity alumina directly from low purity alkoxide by a process which requires relatively less energy than conventional distillation as is required in aluminas produced in aqueous hydrolysis. Recovery of the alumina as a dry powder without using conventional drying processes constitutes a significant savings in equipment costs and energy usage. Moreover, the process is far more energy efficient than conventional vapor hydrolysis methods wherein it is necessary to completely vaporize the alkoxide as opposed to simply heating the alkoxide liquid to a temperature below its boiling point. The process of the present invention is simple and results in an alumina having novel properties as compared with aluminas produced by conventional aqueous hydrolysis techniques.

The foregoing disclosure and description of the invention is illustrative and explanatory thereof, and various changes in the method steps may be made within the scope of the appended claims without departing from the spirit of the invention.

What is claimed is:

1. An improved process for the production of alumina comprising heating a liquid aluminum trialkoxide to an elevated temperature below the boiling point of said alkoxide, introducing steam into the vapor phase above the surface of said heated alkoxide to effect at least partial hydrolysis of at least some of the alkoxide molecules at the surface of the heated alkoxide, flowing a mixture of steam and said at least partially hydrolyzed alkoxide through a heated reaction zone to effect complete hydrolysis of said alkoxide and form a product stream comprising alumina, excess steam and alcohol maintaining said product stream at a temperature sufficient to prevent condensation of said water and alcohol and recovering alumina produced by said hydrolysis of said alkoxide.

2. The process of claim 1 wherein said aluminum trialkoxide comprises the reaction product of an aluminum bearing material and a low molecular weight alcohol having from 2 to 6 carbon atoms.

3. The process of claim 2 wherein said alcohol comprises a branched chain alcohol.

4. The process of claim 3 wherein said alcohol comprises isopropanol.

5. The process of claim 1 including passing said product stream through a solid, particulate collection means to collect said alumina as a dry powder.

6. The process of claim 5 wherein said collection means comprises a heated filter, heated cyclone collector, or other heated means.

7. The process of claim 5 including recovering said alumina from said collection means.

8. The process of claim 7 including recovering the alcohol from the product stream after said alumina has been recovered.

* * * * *